Jan. 1, 1935.  J. D. CARROLL  1,986,556
ROTARY INTERNAL COMBUSTION ENGINE
Filed Sept. 18, 1929   2 Sheets-Sheet 1
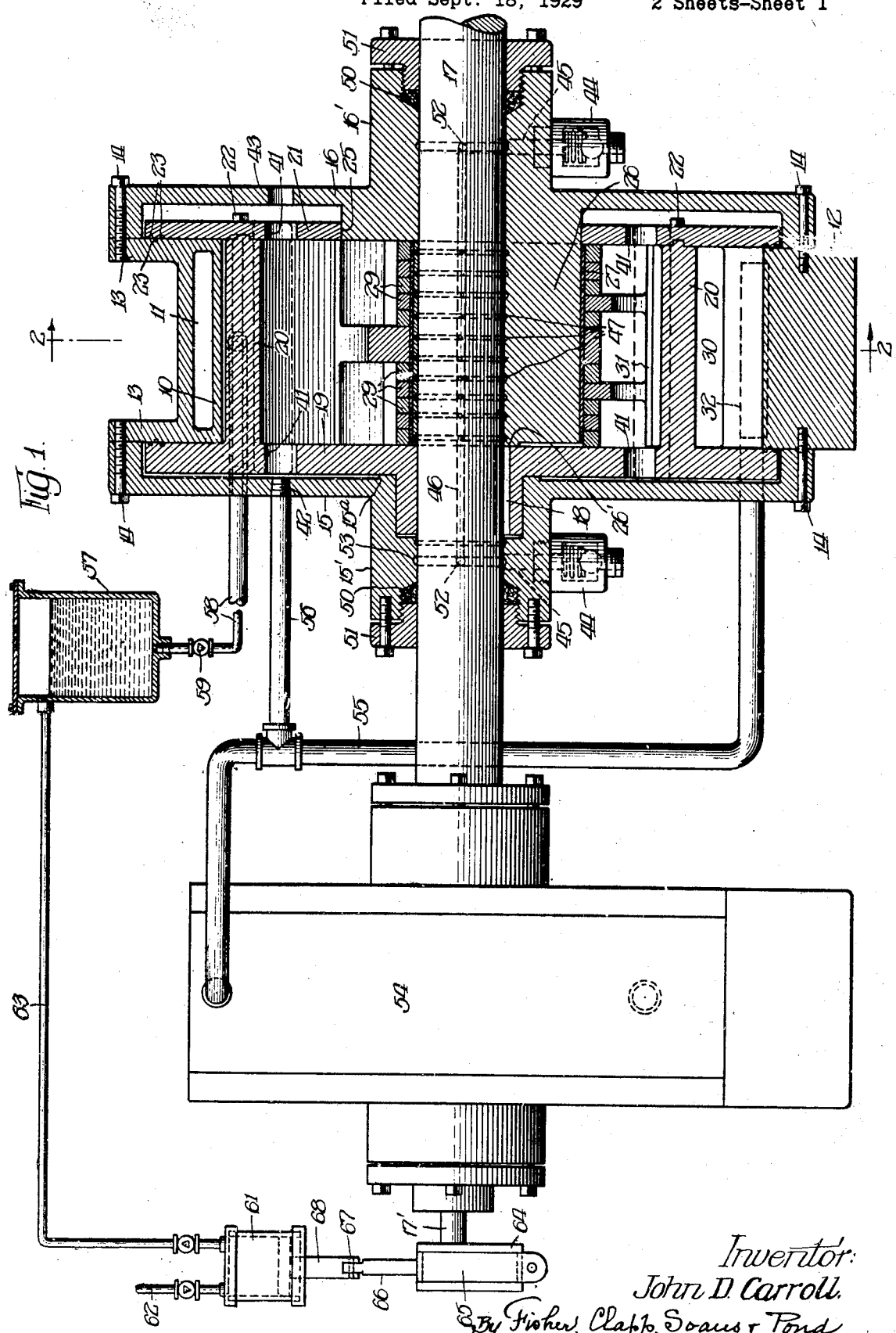
Inventor:
John D. Carroll.
By Fisher, Clapp, Soans & Pond,
Attys

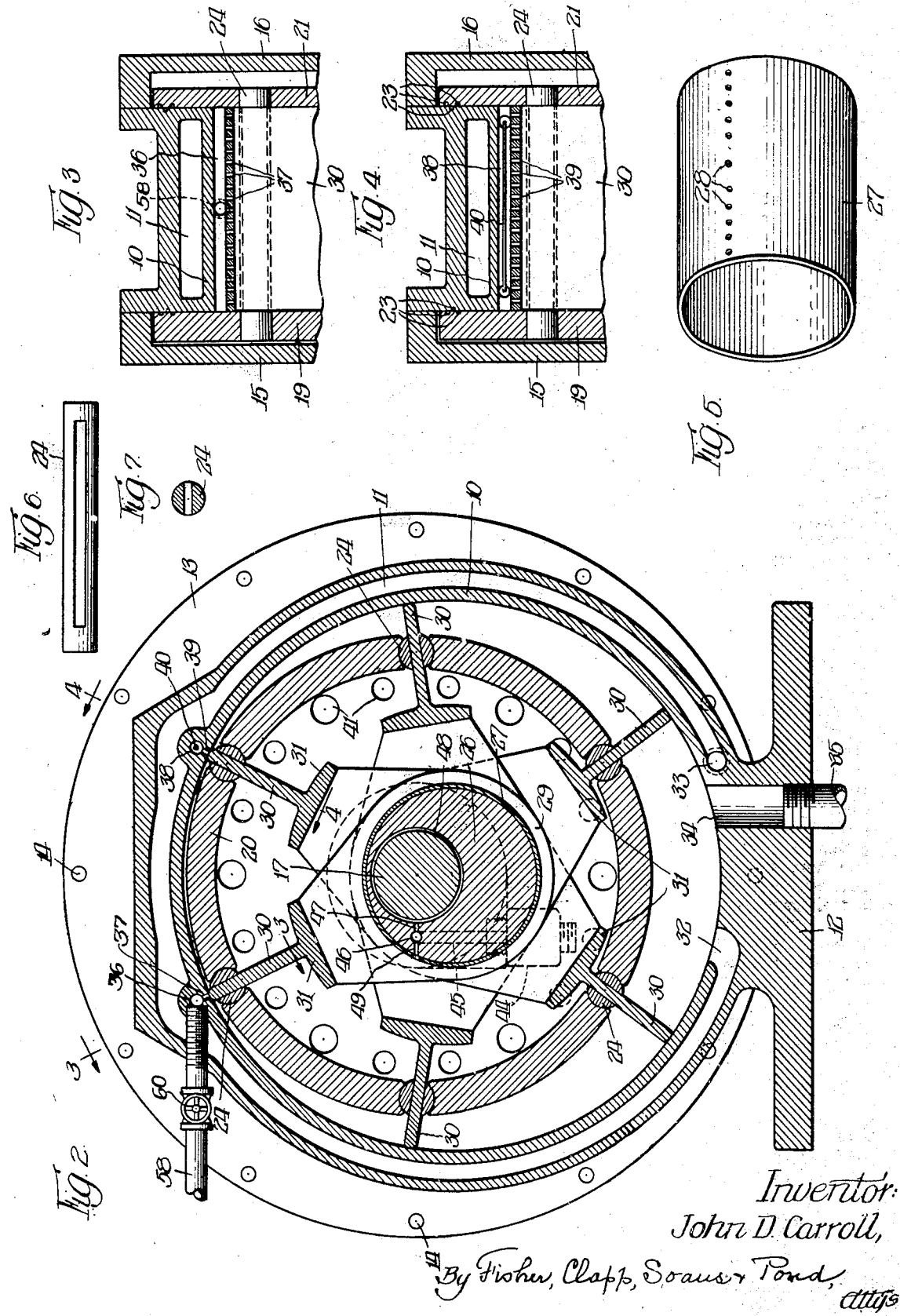

Patented Jan. 1, 1935

1,986,556

UNITED STATES PATENT OFFICE 1,986,556

ROTARY INTERNAL COMBUSTION ENGINE

John D. Carroll, Binghamton, N. Y., assignor to Ellen E. Harrison, Hallstead, Pa.

Application September 18, 1929, Serial No. 393,371

7 Claims. (Cl. 123—16)

This invention relates to the art of rotary internal combustion engines, and the novel improvements forming the subject matter of the present invention relate chiefly to rotary engines of the eccentric piston type, although some of the improved features are equally capable of application to engines of the concentric piston or other types.

Among the principal objects of the invention are, to provide a rotary internal combustion engine characterized by extreme simplicity of construction, capacity for high speed, and a minimum of friction in the operating parts; to provide, in an engine of this type, improved means for supplying either or both compressed air and fuel to the motor through the agency of a pump or pumps driven by the engine shaft; to provide an improved means for air cooling either or both the cylinder and piston drum to maintain the same within working temperatures; to provide a construction wherein the compressed air supplied for the combustible mixture may be most effectively preliminarily heated by the cylinder itself, and serve as a cooling agent for the latter; to provide an improved mechanism for introducing the fuel in the form of gas or oil into the presence of the compressed air to form the explosive mixture, and to provide an improved construction which permits the firing of the combustible charge substantially at its point of maximum compression.

Other objects and attendant advantages of the invention will be apparent to persons skilled in the art as the same becomes better understood by reference to the following detailed description, taken in connection with the accompanying drawings wherein I have illustrated in part diagrammatically a complete internal combustion unit embodying the principles of the invention, and in which—

Fig. 1 is an elevational view of the complete unit, with the motor and fuel tank appearing in vertical axial section.

Fig. 2 is a transverse section through the motor on the line 2—2 of Fig. 1.

Fig. 3 is a sectional detail through the fuel admission port taken on the line 3—3 of Fig. 2.

Fig. 4 is a similar view of the ignition device taken on the line 4—4 of Fig. 2.

Fig. 5 is a perspective elevation of a wear sleeve or bushing for the piston rings.

Fig. 6 is a detail elevation of one of the piston blade swivels or rockers.

Fig. 7 is a cross section of the swivel or rocker shown in Fig. 6.

Referring to the drawings, 10 designates the circular body member of the cylinder, and 11 an air jacket which encircles approximately the entire circumference of the cylinder 10; the cylinder and air jacket being supported upon a suitable pedestal 12 which may in practice be cast integral therewith. Integral with the cylinder and its air jacket are radially extending flanges 13, to which and the pedestal 12 are secured, as by screws 14, the stationary side walls 15 and 16 of the cylinder. These side walls are formed with integral outwardly extending bearing bosses 15' and 16' respectively, through which and the cylinder extends a steel shaft 17 forming the driven shaft of the motor. As shown in Fig. 1, the shaft 17 extends for some distance beyond the bearing boss 15', and constitutes the driving means of an air pump and a fuel pump hereinafter referred to.

Within the cylinder and made fast with the shaft 17 as by a key 18 is the piston drum. As herein shown, this drum is a hollow structure and comprises a circular flat end wall 19, the hub of which is keyed to the shaft 17, an integral cylindrical wall 20, and another flat circular wall 21 having a tongue and groove joint with the cylindrical wall 20 and attached to the latter as by screws 22. By reference to Fig. 1 it will be seen that the end walls 19 and 21 of the drum are spaced from the cylinder side walls 15 and 16 and extend beyond the cylindrical portion 20 thereof and overlap the ends of the cylinder 10 and its flanges 13. To avoid the use of packing, which is short lived under the high heat generated and creates an undesirable amount of friction, I preferably provide for a clearance of approximately one and one-half thousandths of an inch between the surfaces and form in the latter packing grooves indicated by 23 which are known as labyrinthine packing such as is used on turbines.

The cylinder member 20 of the drum is transversely slotted at uniformly spaced points (6 as herein shown) to receive longitudinally slotted swivels or rockers 24, one of which is shown in detail in Figs. 6 and 7.

Integral with the end wall 16 of the cylinder is a short hub 25 which constitutes a bearing for the end wall 21 of the drum; and continuous and preferably integral with the hub 25 is a bearing boss 26 that is co-axial with the cylinder and eccentric to the piston drum and extends across the latter. Fitted on this bearing boss 26 is a hardened steel wear sleeve or bushing 27, shown in isolated detail in Fig. 5, the same being formed with a longitudinal row of oil ports or holes 28. Encircling and having a bearing on the bushing 27 are the rings 29 of a group of piston blades 30 that extend through the slots of the rockers 24 and at their outer ends are in wiping contact with the inner surface of the cylinder 10. Each blade 30 at its inner end is formed with a stem or shank portion 31 to which, in the case of one of the blades a single central piston ring is connected, and in the case of the other blades a pair of piston rings are connected; the piston rings of the swivel blades being inter-nested as clearly shown in Fig. 1.

The above described construction forms, as shown in Fig. 2, a crescent-shaped chamber between the cylinder and the drum, which chamber is divided by the swivel piston blades into a plurality of segmental crescent-shaped chambers, those on the right side of Fig. 2 forming combustion or working chambers, and those on the left side of Fig. 2 constituting air compression chambers. By reference to Fig. 2 it will be observed that the air jacket 11 at one end thereof communiactes with the lowermost of the segmental chambers last described, through a port 32, while the opposite end of the air jacket communicates with a compressed air supply pipe through a port 33. Between the ports 32 and 33 is an exhaust duct 34 which may extend downwardly through the pedestal 12 and communicate with a discharge pipe 35.

Describing next the means by which the fuel, such as gas or oil is supplied to the cylinder, and referring particularly to Fig. 3, in and transversely of the wall of the cylinder 10 is formed a hole 36 that communicates with the interior of the cylinder through a plurality of small perforations 37 directly below the hole 36.

For igniting or firing the combustible charge, I preferably employ the device illustrated in Fig. 4, wherein it will be seen that a hole 38, similar to the hole 36 is formed in and transversely of the cylinder wall at a point beyond the fuel inlet hole 36 with reference to the direction of rotation of the piston drum, the hole 38 also communicating with the interior of the cylinder by a plurality of small holes 39. Extending through the hole 38 and at its ends connected to a source of electric current is a fine wire or filament 40 which, when the engine is running, is heated to incandescence. By reference to Fig. 2 it will be seen that the fuel intake port and the ignition device are spaced apart a distance slightly greater than the distance between adjacent piston blades, so that the ignition port is not uncovered to permit ignition of the charge between the two blades until the next following blade has passed the fuel intake port, so that back firing into the fuel intake port or into the following chamber is avoided.

To provide for internal cooling of the piston drum, each of the side walls of the latter is formed with a circular row of holes 41 which, as the drum rotates, sweep past an air inlet hole 42 in the cylinder wall 15 and an air outlet hole 43 in the cylinder wall 16, whereby compressed air forced in through the hole 42 floods the interior of the piston drum and flows out from the latter through the hole 43, thus maintaining the piston drum at working temperature and avoiding overheating of the drum, rockers and piston blades. The cooling air also bathes the outer sides of the end walls of the drum, further contributing to the cooling of the latter.

To avoid friction of the end walls 19 and 21 of the piston drum on the end walls 15 and 16 of the cylinder, ample clearance is provided between the drum and cylinder walls, as clearly shown in Fig. 1; and to provide for the slight clearance between the end walls 19 and 21 of the drum and the cylinder flanges 13, hereinabove referred to, the piston ring bearing boss 26 is formed at its free end with a reduced extension 26' bearing against the drum wall 19, and the cylinder hub 15' is formed with a similar reduced extension 15ᵃ which bears against the outer side of the drum wall 19 and, through the latter and the cylindrical section 20 of the drum, maintains the slight clearance above referred to between the drum wall 21 and the cylinder flange 13.

In Figs. 1 and 2 I have indicated a provision for effecting lubrication of the shaft 17 in the bearing boss 26 and hubs 15' and 16' and of the piston rings 29 on the bushing 27. In the hubs 15' and 16' of the cylinder are fitted alemite connections 44 that communicate with oil ducts 45, the inner ends of which latter ducts communicate with a longitudinal duct 46 that extends through the cylinder hubs 15' and 16' and the intermediate bearing boss 26. From one side of the duct 46 a group of short lateral ducts 47 (Fig. 2) lead into annular grooves 48 in the shaft bearing face of the member 26, and from the other side of the longitudinal duct 46 a similar group of short lateral ducts 49 register with the holes 28 of the bushing 27, whereby lubricant is supplied to the piston rings.

The shaft bearing hubs 15' and 16' are, of course, equipped with usual shaft packings 50 and glands 51, and lubricant is supplied to the shaft within said hubs by similar lateral ducts 52 leading from the ends of the longitudinal duct 46 into oil grooves 53 formed in the shaft bearing faces of the hubs 15' and 16'.

As hereinbefore stated, the invention in its complete form contemplates the employment of means operated by the engine shaft 17 for supplying compressed air at from approximately four pounds to eight pounds pressure to the engine for both charge forming and cooling purposes, and also means driven by the engine shaft 17 for supplying fuel for the combustible charges. Any suitable device in the general nature of air and fuel pumps may be employed for this purpose, but in Fig. 1 I have indicated a rotary air compressor designated as an entirety by 54 which may be of the same general type as the motor itself although preferably employing a lesser number of piston blades. From the compressed air discharge side of the pump 54 a pipe line 55 leads to the air intake port 33 of the cylinder jacket 11; and from the pipe 55 a branch pipe 56 leads to the air inlet hole 42 of the cylinder, through which air is supplied for the cooling of the piston drum and the piston blades.

To secure a substantially uniform and constant flow of fuel to the fuel supply port of the cylinder, I preferably employ a fuel tank 57, from the bottom of which a flow pipe 58 leads to the fuel intake port 36 of the cylinder; the pipe 58 being equipped with a downwardly opening check valve 59 and a throttle valve 60, preferably located near the port 36 for starting, stopping and controlling the engine. 61 designates a fuel pump equipped with an intake pipe 62 leading from a source of fuel supply, and a discharge pipe 63 leading into the fuel tank or reservoir 57. This revervoir is sealed at its upper end, as indicated, to provide for an air cushion above the level of the liquid fuel so as to maintain a substantially uniform and constant pressure on the body of fuel in the tank. This pressure is, of course, maintained by the fuel pump 61 at a higher point than the pressure of the air as compressed by the engine. The fuel pump 61 is driven from a reduced extension 17' of the shaft 17 by an eccentric 64 on said shaft extension, an eccentric strap 65 and a connecting rod 66 pivoted at 67 to the piston rod 68 of the pump.

Describing the operation, the engine shaft 17 is initially rotated by a suitable starting mechanism, which actuates the air compressor 54 and fuel pump 61, and supplies air to the engine cylinder through the air jacket 11 and intake port 32 and at the same time starts the flow of gasoline or other fuel into the fuel reservoir 57 and, the throttle valve 60 having been opened, the fuel flows into the port 36 and through the small ducts 37 is distributed across the entire width of the cylinder.

By the initial rotation of the piston drum, the air entering at the port 32 is compressed on the left hand side of the drum, and as fast as each segmental chamber in which the air is being compressed passes the fuel intake port, fuel enters and commingles with the compressed air, the mixture being still further compressed into the narrow space between the top segment of the cylinder wall and the top segment of the drum lying between the fuel intake port and the ignition device, as shown in Fig. 2. As soon as this narrow space has been cut off from the connection of the fuel intake port by the passage of the rear blade over the latter, the advance blade runs past and opens the ignition port, whereupon the combustible charge is ignited. At this point the area of the advance blade subject to pressure is slightly greater than that of the trailing blade, so that the drum then continues to rotate partly under the power of the fired charge. The successively united charges continue to expand through the segmental crescent-shaped chambers on the right half of the cylinder, until the advancing blade of each chamber sweeps past the port 34, whereupon the spent charge exhausts through the latter. As soon as the advancing blade has swept past the air inflow port 32, the inrush of air first scavenges and cleans the chamber open to the ports 32 and 34, and as soon as the trailing blade has passed the exhaust port 34, the air forced into the chamber is trapped and is compressed around to the ignition point.

Of course, for ignition purposes one or more spark plugs actuated by a suitable timer might be employed; but where the piston is designed to rotate at a very high speed, such as 3,000 R. P. M. which, with six piston blades would means 18,000 explosions per minute, I have found that a continuously burning ignitor, so placed with reference to the fuel intake port as to render back firing into the latter impossible, is preferable. I have also found that at high speed the ignition duct 38 will carry fire past the blade to the next on-coming charge, so that ignition means are required only for starting the engine.

By causing the in-coming air for the charges to travel through an air jacket extending approximately entirely around the cylinder, a double advantage is gained in that the cylinder is cooled, and the air for the combustible charges is preliminarily heated, this provision thus effecting a desirable heat exchange. After the first two or three explosions the engine operates under its own power and, through the air and fuel pumps, supplies its own motive fluid. The features of a fuel intake port and an igniting device both extending across the entire width of the cylinder contribute substantially to uniform and reliable action, and a complete combustion and consequent maximum efficiency of each charge.

In the foregoing description and the accompanying drawings I have set forth one embodiment of the present invention which satisfactorily effectuates the stated purposes and advantages thereof; but manifestly many variations in the forms and relative arrangements of the parts may be resorted to without involving any departure from the invention or sacrificing any of the advantages thereof. Hence, I do not limit the invention to the specific embodiment shown for purposes of illustration, but reserve all such variations, modifications, and mechanical equivalents as fall within the spirit and purview of the claims.

I claim:

1. In a rotary internal combustion engine, the combination of a cylinder formed with a circular internal peripheral wall, a slotted piston drum journaled in said cylinder eccentrically of the latter, the periphery of said drum being spaced throughout from the opposed wall of said cylinder, piston blades slidable in the slots of said drum and in wiping contact with the internal wall of said cylinder, said cylinder, drum and blades forming a group of segmental crescent-shaped chambers, a closed air jacket around said cylinder having a port communicating with the latter, means for supplying compressed air to said jacket, means for supplying fuel successively to said chambers after the latter have passed said port, means for firing the combustible charges in said chambers substantially at the points of maximum compression of the charge, and an exhaust duct communicating with said cylinder.

2. In a rotary internal combustion engine, the combination of a cylinder formed with a circular internal peripheral wall, a slotted piston drum journaled in said cylinder eccentrically of the latter, the periphery of said drum being spaced throughout from the opposed wall of said cylinder, piston blades slidable in the slots of said drum and in wiping contact with the internal wall of said cylinder, said cylinder, drum and blade forming a group of segmental crescent-shaped chambers, a closed air jacket encircling the major portion of the circumference of said cylinder, said jacket having at one end thereof a single continuously open port communicating with said cylinder, a compressed air pipe leading into the other end of said jacket, means located in the cylinder wall for supplying fuel successively to said chambers after the latter have passed said port, means located in the cylinder wall for firing the combustible charges in said chambers substantially at the point of maximum compression of the charge, and an exhaust duct communicating with said cylinder between the ends of said jacket.

3. In a rotary internal combustion engine, the combination of a cylinder, a closed air jacket encircling approximately the entire circumference of said cylinder and at one end thereof ported to the interior of said cylinder, a rotary piston in said cylinder, a shaft fast with said piston and extending outside said cylinder, an air pump driven by said shaft and wholly spaced from said cylinder, and a flow pipe leading from the discharge side of said pump to the other end of said cylinder air jacket.

4. In a rotary internal combustion engine, the combination of a cylinder formed with air inlet and exhaust holes in its opposite sides respectively, a hollow rotary piston in said cylinder formed with holes in its opposite ends adapted as the piston rotates, to sweep across the holes in the sides of said cylinder, there being clearance spaces between the opposed sides of said cylinder and ends of said piston adapted to be flooded by cooling air, a shaft fast with said piston and extending outside said cylinder, an air pump driven by said shaft and wholly spaced from said cylinder, and a flow pipe leading from the discharge side of said pump directly to the air inlet hole of said cylinder.

5. In a rotary internal combustion engine, the combination of a cylinder formed with a circular internal peripheral wall, a slotted piston drum eccentrically disposed in said cylinder, the periphery of said drum being spaced throughout from the opposed wall of said cylinder, a shaft coaxial and fast with said drum, a stationary bearing member in and coaxial with said cylinder, pistons comprising rings encircling said bearing member and blades extending through the slots of said drum and in wiping contact with the internal wall of said cylinder, said cylinder, drum and blades forming a group of segmental crescent-shaped combustion and compression chambers on the working and compression sides respectively of said cylinder, means for supplying air under pressure successively to said chambers on the compression side of said cylinder, a fuel supply port in the cylinder wall so located that the charge in each chamber is compressed during the entire passage of the chamber past said port, means for firing the charge in each chamber at a point in said cylinder located beyond said fuel supply port a distance greater than the distance between adjacent blades, and means for exhausting the spent charges.

6. In a rotary internal combustion engine, the combination of a cylinder formed with air inlet and outlet holes in its opposite sides respectively, a hollow slotted piston drum journaled in said cylinder eccentrically of the latter with clearance spaces between its end walls and the side walls of the cylinder and formed with a plurality of holes in its end walls adapted to admit air from one clearance space to the interior of the drum and discharge the air from the interior of the drum to the other clearance space, piston blades slidable in the slots of said drum and in wiping contact with the internal walls of said cylinder, said cylinder, drum and blades forming a group of segmental crescent-shaped chambers, means for admitting combustible charges successively to said chambers, means for firing said charges, means for exhausting the spent charges successively from said chambers, and a compressed air supply pipe connected into said cylinder air inlet hole.

7. In a rotary internal combustion engine, the combination of a cylinder formed with an air inlet hole and an air outlet hole in its opposite sides respectively, a hollow slotted piston drum journaled in said cylinder eccentrically of the latter with clearance spaces between its end walls and the side walls of the cylinder and formed with circular rows of holes in its end walls so located as to sweep across said cylinder inlet and outlet holes as said drum rotates, and thereby admit air from one clearance space to the interior of the drum and discharge the air from the interior of the drum to the other clearance space, piston blades slidable in the slots of said drum and in wiping contact with the internal wall of said cylinder, said cylinder, drum and blades forming a group of segmental crescent-shaped chambers, means for admitting combustible charges successively to said chambers, means for firing said charges, means for exhausting the spent charges successively from said chambers, and a compressed air supply pipe directly connected into said cylinder air inlet hole.

JOHN D. CARROLL.

CERTIFICATE OF CORRECTION.

Patent No. 1,986,556.  January 1, 1935.

JOHN D. CARROLL.

It is hereby certified that error appears in the printed specification of the above numbered patent requiring correction as follows: Page 1, second column, for "thereof" read of the drum; page 3, second column, line 33, claim 1, after the article "a" insert the words single continuously open; and that the said Letters Patent should be read with these corrections therein that the same may conform to the record of the case in the Patent Office.

Signed and sealed this 5th day of March, A. D. 1935.

Leslie Frazer (Seal)  Acting Commissioner of Patents.